No. 749,610. PATENTED JAN. 12, 1904.
P. JENNESS.
VEHICLE HUB.
APPLICATION FILED OCT. 28, 1903.
NO MODEL.
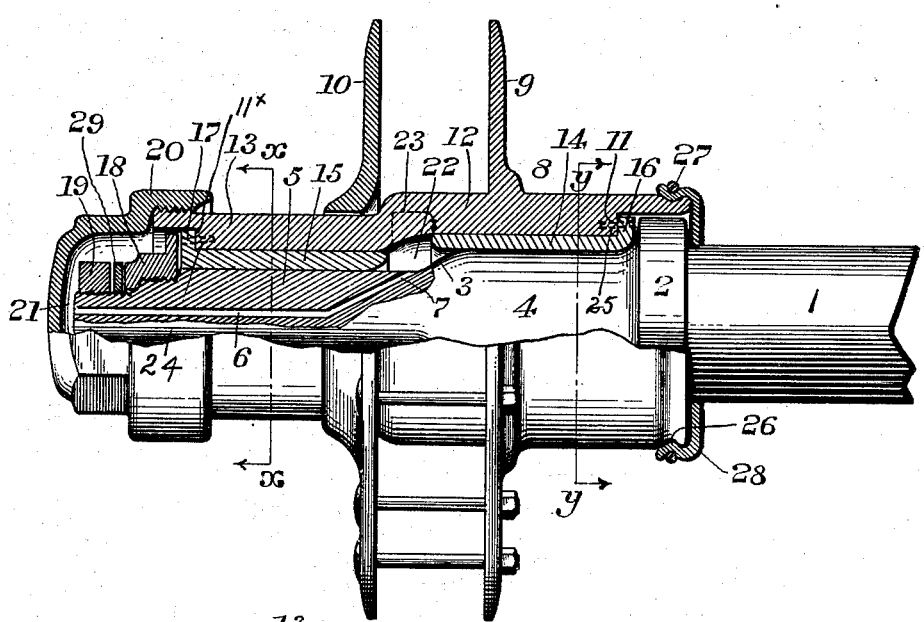
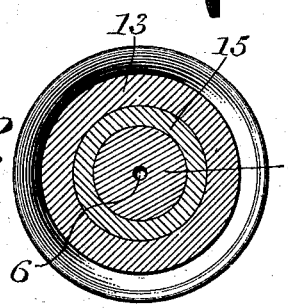
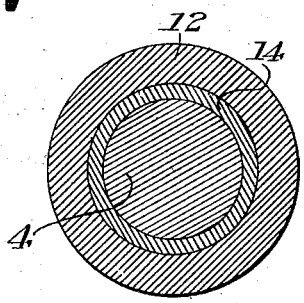
Witnesses
L. Houville,
P. F. Nagle.
Inventor
Peter Jenness.
By Wiedersheim Fairbanks
Attorneys No. 749,610. Patented January 12, 1904.

UNITED STATES PATENT OFFICE.

PETER JENNESS, OF PHILADELPHIA, PENNSYLVANIA.

VEHICLE-HUB.

SPECIFICATION forming part of Letters Patent No. 749,610, dated January 12, 1904.

Application filed October 28, 1903. Serial No. 178,828. (No model.)

*To all whom it may concern:*

Be it known that I, PETER JENNESS, a citizen of the United States, residing at Philadelphia, in the county of Philadelphia and State of Pennsylvania, have invented a new and useful Improvement in Hubs for Vehicle-Wheels, of which the following is a specification.

My invention relates to hubs for vehicle-wheels and means for lubricating the same.

It consists in providing antifriction metallic bushings between the axle and the hub in combination with a passage adapted to carry grease or similar lubricant to the bearing portion.

It further consists of novel features of construction, all as will be hereinafter fully set forth.

Figure 1 represents, partially in elevation and partially in vertical section, an axle and hub embodying my invention. Figs. 2 and 3 represent transverse sections through the lines $x\ x$ and $y\ y$, Fig. 1, respectively.

Similar numerals of reference indicate corresponding parts in the figures.

Referring to the drawings, 1 designates an axle having the usual thrust or shoulder 2 and a second shoulder 3, separating the portions 4 and 5, which are of different diameters. From the free end of the axle is drilled a longitudinal hole 6, communicating with a passage 7, leading to the periphery of the axle adjacent the shoulder 3.

8 designates a hub having the usual tight and loose flanges 9 and 10, respectively. It is also provided with the shoulders 11 and $11^\times$, respectively, of the inner and outer ends of the portions 12 and 13, which are of different diameters.

Between the axle and the box are bushings 14 and 15, of bronze or other hard antifriction metal, provided with flanges 16 and 17, respectively. These bushings are forced snugly into the portions 12 and 13 of the hub, so as to rotate therewith, and are held in place by set-screws or pins 24 and 25, as shown in Fig. 1. It will be seen by reference to this figure that the outturned flanges 16 and 17 on these bushings serve to prevent any contact between the hub and the shoulder 2 or the nut 18. At the free end of the axle are formed right and left threads, adapted to engage with the nuts 18 and 19, between which is located the lock-washer 29, and on the hub 8 is a thread adapted to engage a cap 20. The cap 20, as shown, has a chamber 21 of sufficient capacity to hold a considerable quantity of grease or similar lubricant.

It will be noted that the passages 6 and 7 communicate with the space 21 within the cap 20 and lead therefrom to a space 22 between the axle 1 and hub 8, which space is produced by the separation of the ends of the bushings 14 and 15, respectively.

I have shown in dotted lines, Fig. 1, that this space may be increased, if desired, by forming an annular groove 23 in the hub 8 adjacent the space 22.

At the inner end of the hub-body 8 is formed a groove 26, within which is held, as by a clamping-wire 27 or its equivalent, an annular washer 28, the inner periphery of which fits snugly over the axle 1 for the purpose of excluding dust from the hub.

The operation is as follows: The parts being otherwise assembled, a considerable quantity of grease or viscous lubricant is placed in the space 21 in the cap 20, the cap being then screwed into place. It is evident that this lubricant will be gradually forced through the passages 6 and 7 to the space 22 and thence to the bearing-surfaces of the antifriction metallic bushings 14 and 15, as is required.

It is evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In an axle, a hub, an antifriction metallic bushing between said axle and said hub, means providing an annular space between said axle and said hub and intermediate the ends of the latter, a cap at the other end of said hub and a passage leading from said cap to such annular space.

2. An antifriction device comprising an axle, a thrust-shoulder on said axle, a hub, antifriction metallic bushings interposed between said axle and said hub and a nut at the outer end of said axle, said bushing being provided with flanges between said hub and said shoulder and nut.

3. In combination a vehicle-axle, a hub on said axle and a flexible washer secured to the inner end of said hub fitting smoothly about said axle.

4. In combination a vehicle-axle, a hub on said axle and having an annular groove adjacent its inner end, a flexible washer surrounding the inner end of said hub and said axle and adapted to fit smoothly about the latter and means for securing said washer within said groove.

PETER JENNESS.

Witnesses:
E. HAYWARD FAIRBANKS,
JOHN A. WIEDERSHEIM.